United States Patent [19]

Emma et al.

[11] Patent Number: 5,297,281
[45] Date of Patent: Mar. 22, 1994

[54] MULTIPLE SEQUENCE PROCESSOR SYSTEM

[75] Inventors: Philip G. Emma, Danbury, Conn.; Joshua W. Knight, Mohegan Lake, N.Y.; James H. Pomerene, Chappaqua, N.Y.; Rudolph N. Rechtschaffen, Scarsdale, N.Y.; Frank J. Sparacio, Sarasota, Fla.

[73] Assignee: International Business Machines Corporation, Armonk, N.Y.

[21] Appl. No.: 836,193

[22] Filed: Feb. 13, 1992

Related U.S. Application Data

[63] Continuation of Ser. No. 342,494, Apr. 24, 1989, abandoned.

[51] Int. Cl.$^5$ .............................. G06F 9/38; G06F 9/28
[52] U.S. Cl. ...................................... 395/650; 395/375; 364/231.8; 364/261.3; 364/262.4; 364/DIG. 2; 364/948.34; 364/948.3; 364/948.11
[58] Field of Search ................... 364/DIG. 1, DIG. 2; 395/375, 650

[56] References Cited

U.S. PATENT DOCUMENTS

| | | | |
|---|---|---|---|
| 3,559,183 | 1/1971 | Sussenguth . | |
| 3,648,253 | 3/1972 | Mullery et al. | 364/200 |
| 3,760,365 | 9/1973 | Kurtzberg et al. | 340/172.5 |
| 4,107,773 | 8/1978 | Gilbreath et al. . | |
| 4,224,665 | 9/1980 | de Bijl et al. | 364/200 |
| 4,295,193 | 10/1981 | Pomerene . | |
| 4,468,736 | 8/1984 | DeSantis et al. | 364/200 |
| 4,476,525 | 10/1984 | Ishii . | |
| 4,679,141 | 7/1987 | Pomerene et al. . | |
| 4,691,277 | 9/1987 | Kronstadt et al. | 395/400 |
| 4,760,520 | 7/1988 | Shintani et al. | 395/375 |
| 4,766,566 | 8/1988 | Chuang . | |
| 4,829,422 | 5/1989 | Morton et al. | 364/200 |
| 4,833,599 | 5/1989 | Colwell et al. | 364/200 |
| 4,847,755 | 7/1989 | Morrison et al. | 395/650 |
| 4,860,197 | 8/1989 | Langendorf et al. | 395/375 |
| 4,942,525 | 7/1990 | Shintani et al. | 364/200 |
| 4,974,155 | 11/1990 | Dulong et al. | 395/375 |
| 4,991,080 | 2/1991 | Emma et al. | 364/200 |
| 5,133,677 | 7/1992 | Karne et al. | 395/800 |

*Primary Examiner*—Gareth D. Shaw
*Assistant Examiner*—Lucien Toplu
*Attorney, Agent, or Firm*—Ratner & Prestia

[57] ABSTRACT

A digital computer includes a main and an auxiliary pipeline processor which are configured to concurrently execute contiguous groups of instructions taken from a single instruction sequence. The instructions in a sequence may be divided into groups by using either taken-branch instructions or certain instructions which may change the contents of the general purpose registers as group delimiters. Both methods of grouping the instructions use a branch history table to predict the sequence in which the instructions will be executed.

11 Claims, 11 Drawing Sheets

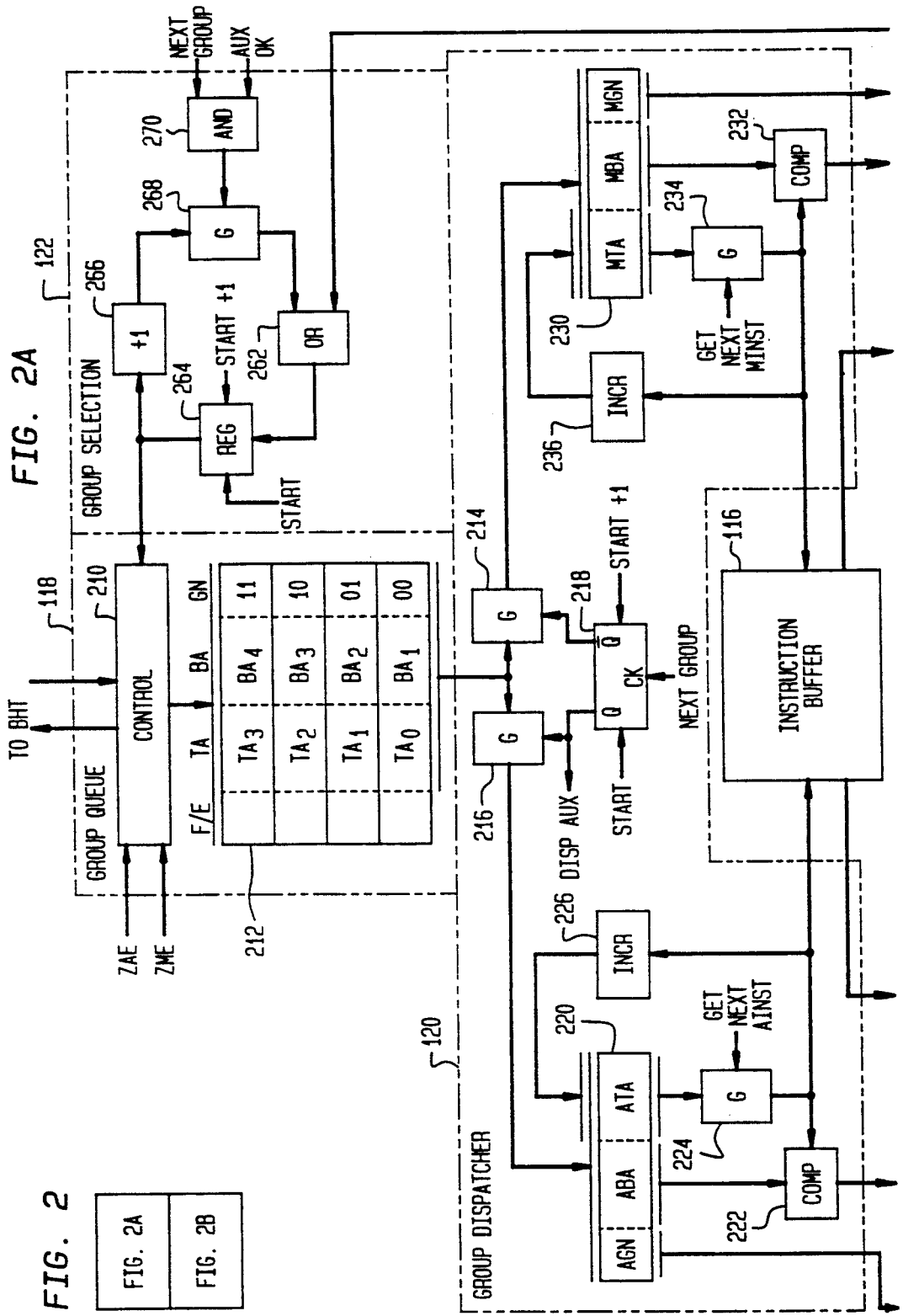

FIG. 2C

| | INST ADDR | INST | |
|---|---|---|---|
| ⑦ | 02DE28 | BAL | |
| | 02E104 | ST | |
| 1 | 108 | TM | 1 |
| | 10C | BC | |
| | 110 | TM | |
| ① | 114 | BC | |
| 2 | 02E17A | L | |
| | 17E | LA | |
| | 182 | LTR | |
| ② | 184 | BC | |
| 3 | 02E1DE | TM | 2 |
| ③ | 1E2 | BC | |
| | 02E208 | NI | |
| | 20C | MVI | |
| | 210 | LH | |
| | 214 | N | |
| 4 | 218 | STH | 3 |
| | 21C | L | |
| | 220 | L | |
| | 224 | MVI | |
| | 228 | TM | 4 |
| ④ | 22C | BC | |
| | 02E234 | LH | |
| 5 | 238 | N | |
| | 23C | LTR | 5 |
| ⑤ | 23E | BC | |
| 6 | 02E24E | L | |
| | 252 | L | |
| ⑥ | 256 | BALR | 6 |
| | 01DC6E | STM | |
| | C72 | BALR | |
| | C74 | L | 7 |
| | C78 | OI | |
| | C7C | SLR | |

FIG. 2D

| BRANCH # | BRANCH ADDRESS | TARGET ADDRESS | START | START CONT. | END | NEW | NEW | NEW | NEW |
|---|---|---|---|---|---|---|---|---|---|
| 71 | 02DE28 | 02E104 | | | 5 | | | | |
| 1 | 02E140 | 02E07A | 4 | | | | | | |
| 2 | 02E180 | 02E1DE | | 2 | 2 | 3 | | | |
| 3 | 02E2EC | 02E208 | | | | 4 | | | |
| 4 | 02E234 | 02E234 | 3 | | 1 | 3 | 5 | | |
| 5 | 02E3E4 | 02E24E | | | | | | | |
| 6 | 02E256 | 01DC6E | | | | | | | |

← STANDARD BRANCH HISTORY TABLE → ← ADDITIONAL ENTRIES →

← INSTRUCTION COUNTS →

FIG. 2E
GROUP QUEUE

| START ADDRESS | # INSTRS | BRANCH ADDRESS | TARGET ADDRESS |
|---|---|---|---|
| 02DE28 | 14 | 02DE28 | 02EE104 |
|  |  | 02E114 | 02EE17A |
|  |  | 02EE18 | 02EE1DE |
|  |  | 02EE1E2 | 02EE208 |
| 02E210 | 8 |  |  |
| 02E234 | 8 | 02EE23E | 02EE24E |
|  |  | 02EE256 | 01DC6E |
| 01DC72 | -- | -- | -- |

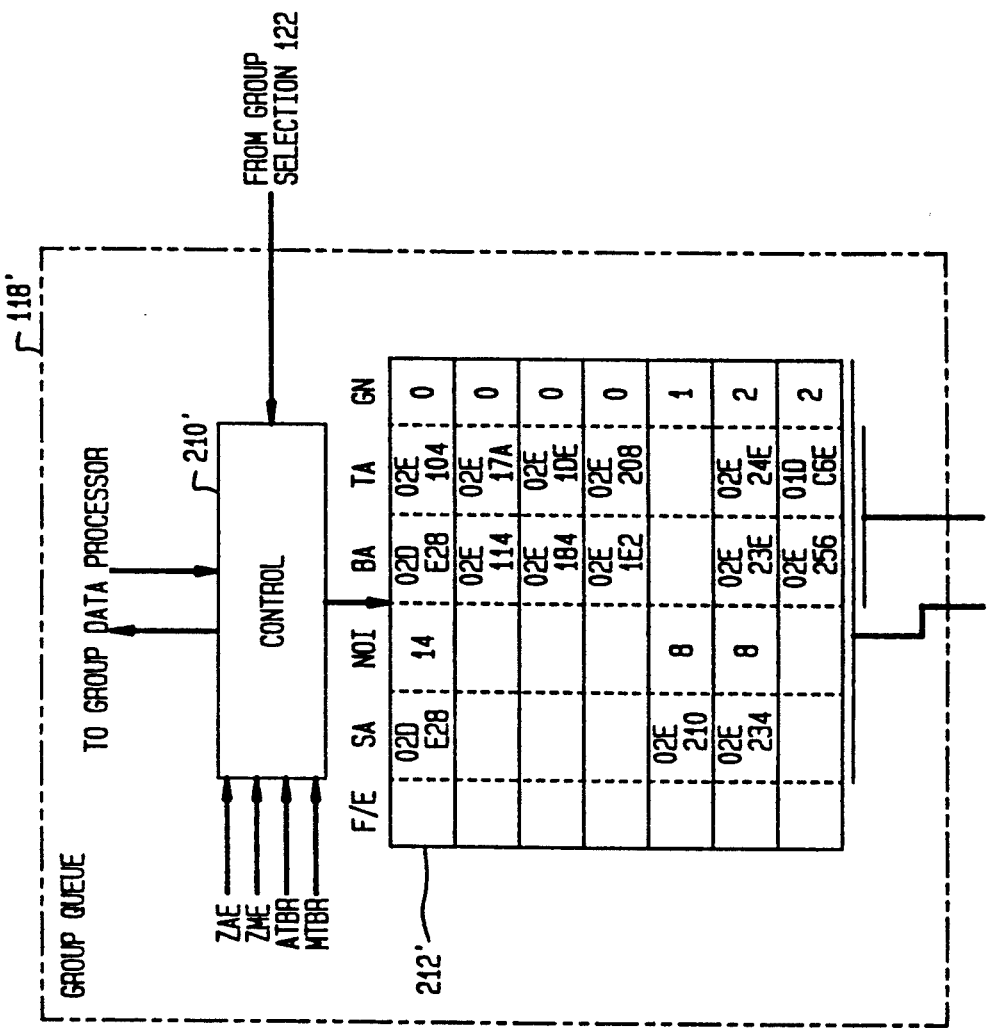

MULTIPLE SEQUENCE PROCESSOR SYSTEM

This application is a continuation of application Ser. No. 07/342,494 filed Apr. 24, 1989, now abandoned.

BACKGROUND OF THE INVENTION

1. Field of the Invention

The present invention generally relates to stored program digital computers and, more particularly, to a computer capable of splitting a single sequence of instructions into two or more sub-sequences and of processing the sub-sequences in parallel.

2. Description of the Prior Art

Many kinds of parallelism have been exploited in pursuit of greater computational speed in a digital computer. A bit-serial computer is a processor without any parallelism. Such a processor will take eight steps to handle an eight-bit byte and, in general n steps to handle an n-bit word. Some of the earliest electronic computers were bit-serial machines. A first type of parallelism that was exploited was to process more than one bit per step. For example, the S/360 family of processors, manufactured by International Business Machines Corporation (IBM), provided a range of speeds partly by varying the number of bits handled per step. These processors handled eight bits per step at the low end and 64 bits per step at the high end. This kind of parallelism has recently been a key factor in the design of microprocessors.

In another kind of parallelism used to increase the speed of a processor, the next subsequent instruction to be executed is read from memory (fetched) while a current instruction is being executed. Since the fetching of an instruction must always precede its execution, there is always some speed to be gained by performing these operations in parallel. This kind of parallelism leads directly to a third kind of parallelism, in which the execution of an instruction is divided into several sub-steps, for example, Instruction Decode, Address Generation, Cache Access, and Algorithm Execution. Each of these sub-steps uses separate hardware in the processor so that it may be done in parallel with other parts of preceding and succeeding instructions.

For optimal performance, it is desirable for a pipeline processor to be simultaneously executing a sequence of several instructions, overlapping the instruction decode operations of one with the address generation of another and the algorithm execution operations of yet another. When a sequence of instructions includes a branch instruction which will be taken, the instructions in the sequence following the branch instruction will not be executed. In this instance, the processor must discard any partial results from the execution of these instructions and restart the pipeline at the target address of the taken branch instruction.

To avoid discarding partial results when a taken branch is encountered, some pipeline processors take advantage of an observed property called "persistence of behavior." Persistence of behavior is a term used to describe the tendency of a processor to repeat previously executed instructions and re-access previously accessed data. This repetitive behavior is pervasive and it has been observed in many situations. As an example of how this behavior may occur, consider a large processor running in a multiprocessor environment under the control of an operating system. In this environment, the processor would spend much of its time executing modules from the operating system. For example, very frequent use would be made of the Task Dispatcher and Lock Manager modules. These modules implement tasks in the operating system that would be impractical to individually program for each application. Clearly these modules and similar modules of the operating system are used over and over again.

There are at least two ways in which persistence of behavior is used to improve processor performance. One is the cache memory and the other is the branch history table (BHT). A cache memory stores instructions and data that have been recently accessed by the processor with the expectation that a considerable fraction of those instructions and data will be used again in the near future. When this is the case—and it is very often—the cache can supply the requested instructions and data very quickly.

The BHT stores information about branch instructions that the processor has encountered with the expectation that the processor will encounter many of the same branch instructions in the near future and that the outcome of executing the branch instruction will be the same. The stored branch information is used to reduce processor delays resulting from the need to restart a pipeline due to changes in program flow caused by a taken branch instruction. As long as the BHT entries remain valid, a pipeline processor using a BHT may proceed uninterrupted through many branch instructions.

A fourth type of parallelism is to decode two or more successive instructions during each cycle. This type of parallelism assumes that each of the sub-steps, referred to above in the discussion of pipeline processors, may be performed in one machine cycle. This is a common capability of high performance processors. This type of parallelism requires two or more sets of instruction decoding hardware and may require two or more sets of address generation hardware, cache accessing hardware and algorithm execution hardware.

It is noted that each kind of parallelism set forth above is separate and distinct in that it can be used in combination with each other kind. In fact, all four kinds of parallelism are used in many high performance processors; each kind contributing its own performance advantage.

U.S. Pat. No. 3,559,183 to Sussenguth and assigned to the assignee of the present invention, describes a pipeline processor which uses a BHT to choose instructions to be executed. The use of a BHT is based on the observation that most branches, considered individually, are consistently either taken or not taken and, if taken, have a consistent target address. The BHT is a table of taken branches. Each entry in the table includes the address of the taken branch followed by its target address. This table is a hardware construct and, so, it has a fixed size, typically from 1024 to 4096 entries. Entries are made only for taken branches as they are encountered. When the BHT is full, making a new entry requires displacing an existing entry. This may be accomplished, for example, by evaluating the entries on a least recently used (LRU) basis as in a cache memory.

U.S. Pat. No. 4,107,773 to Galbreath et al. describes a processor which employs a memory having two independent sections and processing hardware which operates in parallel using one section in conjunction with an arithmetic unit while using the other section in conjunction with data transfer to and from an external memory.

The apparatus described in this patent is an example of the third type of parallelism described above.

U.S. Pat. No. 4,295,193 to Pomerene, assigned to the assignee of the present invention, relates to a processor design for simultaneously executing two or more instructions. The instructions to be executed are divided into groups having, at most, n instructions each, for example, during compilation. Each group may have only a predetermined number of data and instruction fetches and, if the group contains a branch, it must be the last instruction. Each instruction in a group uses separate instruction execution hardware. This is an example of the fourth type of parallelism described above.

U.S. Pat. No. 4,679,141 to Pomerene et al. concerns an optimized BHT for a pipeline processor. The BHT described in this reference includes an active area which contains entries for a small number of branches which the processor may encounter in the near future and a backup area which contains all other entries. Entries are brought into the active area in advance of-when they may be encountered by the processor. As entries are removed from the active area they are put into the backup area. The relatively small size of the active area allows it to be designed for speed and to be optimally located within the processor hardware.

U.S. Pat. No. 4,766,566 entitled "Performance Enhancement Scheme for a RISC type VLSI Processor" by C. M. Chuang relates to a reduced instruction set computer (RISC) design which uses two execution units to process two instructions in parallel. One execution unit may handle any instruction the other execution unit may include only a subset of the hardware in the first unit and may therefore be limited to processing only some types of instructions.

SUMMARY OF THE INVENTION

It is an object of the present invention to provide a technique for exploiting a further type of parallelism to increase the computational speed of a digital data processor.

It is a further object of the present invention to provide an improved pipeline processor design which exploits the property of persistence of behavior to execute instructions at a higher rate than known pipeline processors.

According to the invention, these objects are accomplished by providing multiple pipeline processing stages; means for providing a sequence of instructions to be executed on the processor, where the instructions are divided into groups of sequential instructions according to some delimiting rule; apparatus for storing information identifying the groups in a table; and apparatus for channeling information defining respectively different groups from the table to respectively different ones of the multiple pipeline processing stages for concurrent execution of the instructions which constitute the groups.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE PREFERRED EMBODIMENT OF THE INVENTION

The following is an overview of an exemplary embodiment of a multiple sequence processor system, described with reference to FIG. 1. In essence, the embodiment of the invention described below divides a single sequence of instructions, which may be executed on a single, conventional processor into multiple subsequences according to some delimiting rule. In a first embodiment of the invention described below, the chosen rule is to divide the single sequence into groups of subsequences which are referred to as "branch groups." A branch group includes the subsequence of instructions which would be executed by a single processor immediately following a taken branch instruction up to and including the next taken branch instruction. The delimiters for these subsequences are taken branch instructions. These groups may be defined with reference to a BHT associated with the processor.

In a second embodiment of the invention another rule for dividing the single sequence int subsequences is used. According to this rule, groups or subsequences of instructions are delimited by instructions which modify general purpose registers in the processor architecture. These registers are common to the multiple processors of the multiple sequence processor system.

Figure 1:
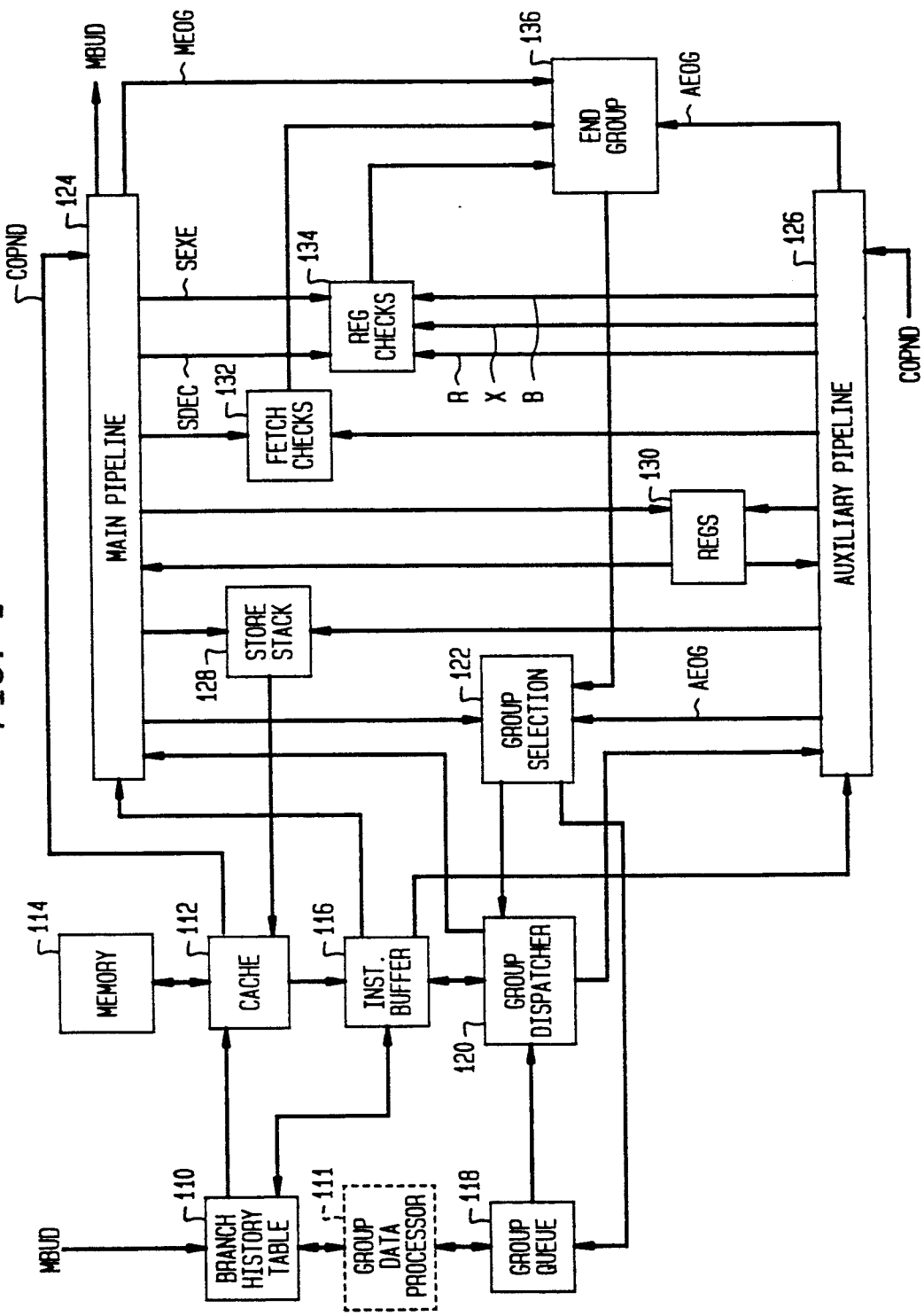
FIG. 1 is a block diagram of a multiple sequence pipeline processor which includes an embodiment of the present invention.

The central elements of the system shown in FIG. 1 are a main pipeline processor 124 and an auxiliary pipeline processor 126. The pipeline processors 124 and 126 may, for example, be of the type used in the Model 3033 processor manufactured by IBM. Each of these processors obtains instructions to be executed from an instruction buffer 116 which, in turn, obtains the instructions from the cache memory 112. The cache 112 also provides operands to the main and auxiliary pipeline processors. The instruction groups to be processed are selected under control of a BHT 110. As explained in detail in the above-referenced U.S. Pat. No. 4,679,141 to Pomerene et al., the BHT provides a pair of address values, BA and TA, for each taken branch that is likely to be encountered. The address value BA is the address of the taken branch instruction; the address value TA is the branch target, the address of the instruction to which the taken branch instruction will transfer control. In the embodiment of the invention described below, a BA address value identifies the last instruction of one group and a TA address value identifies the first instruction of the next successive group.

The BA, TA address value pairs are put into the group queue 118 which identifies the next several groups of instructions which may be dispatched to the main and auxiliary pipelines. At the same time that the BA, TA address value pairs are applied to the group queue 118, they are applied to the cache memory 112 so that the instructions and operands of the various groups may be fetched from the memory 114 and be immediately available to the pipelines 124 and 126. A BHT and instruction buffer of the type used in the present embodiment of the invention and their use for instruction and data prefetching are described in the above-referenced Pomerene et al. patent and, so, are not described in detail herein.

A group dispatcher 120 is responsive to group selection circuitry 122 to apply one pair of values from the group queue 118 to the main pipeline 124 and the next subsequent pair of values to the auxiliary pipeline 126.

The group selection circuitry 122 chooses the pairs of address values such that the main pipeline 124 will execute one group of instructions and the auxiliary pipeline 126 will execute the next successive group of instructions. The pairs of address values defining the groups are applied to the main and auxiliary processors by the group dispatcher 120 under control of the group selection circuitry 122. For example, assume that the group queue 118 contains entries for consecutive groups G1, G2, G3 and G4. If no problems arise during their parallel execution, group G1 will be dispatched to the main processor 124 while group G2 is dispatched to the auxiliary processor 126. When groups G1 and G2 have been executed, group G3 will be assigned to the main processor and group G4 will be assigned to the auxiliary processor. As the groups are executed, additional entries for groups G5, G6, G7 and G8 will be placed in the group queue 118 by the BHT 110. These group entries will be dispatched at a later time.

Since the main and auxiliary pipelines operate in parallel, the execution of instructions in the main pipeline may invalidate the results provided by the auxiliary pipeline. For example, if the auxiliary pipeline 126 produces a value to be stored into the memory 114 based on a value obtained from a register $R_5$ of a register file 130 and, the main pipeline 124 subsequently changes the value in the register $R_5$, the value produced by the auxiliary processor may be invalid and should be discarded. When a group of instructions being executed by the auxiliary pipeline is invalidated, the entry for that group is retained in the group queue and becomes the next group to be dispatched to the main pipeline 124.

To detect problems of this type and other problems which may invalidate the results produced by the auxiliary pipeline 126, the exemplary system shown in FIG. 1 includes fetch check circuitry 132 and register check circuitry 134. The fetch check circuitry 132 determines whether operands fetched from memory by the auxiliary pipeline are invalid because they were fetched from memory locations that have since been stored into by the main pipeline or, for other reasons, may have incorrect values. These other reasons include encountering a serializer instruction and, in multiprocessor systems, the occurrence of a cross-interrogate event. The register check circuitry 134 determines when the auxiliary pipeline 126 has used a value in one of the general purpose registers 130 that was subsequently changed by the main pipeline.

The signals provided by the check circuitry 132 and 134 are applied to end group circuitry 136. The circuitry 136 also receives end of group signals, MEOG and AEOG, from the main and auxiliary pipeline processors 124 and 126, respectively. The pipelines produce these signals when the last instruction of their respective groups of instructions has been executed. The end group circuitry 136 determines whether the results produced by the auxiliary pipeline should be discarded and, if so, which groups of instructions should be the next to be loaded into the main and auxiliary pipeline processors.

The pipelines 124 and 126 both include 16 general purpose registers (GPR's) in their architecture. In the present embodiment of the invention, these registers are physically realized by the register file 130. As explained in detail below, there are 32 registers in the register file 130 of which 16 are "active" and 16 are "temporary" at any given time. The main pipeline works with the active registers. These are the GPR's specified in the processor architecture. The auxiliary pipeline works with both the active and the temporary registers. If the auxiliary pipeline only reads a register $R_i$ it will use the active register $R_i$. However if it changes the value in a register $R_j$ will change only the temporary register $R_j$ and thereafter, if it reads the register $R_j$, it will use the temporary register $R_j$. When the main pipeline completes its group of instructions and when and if the auxiliary pipeline completes its group of instructions without a problem being signalled by the register check circuitry 134 or the fetch check circuitry 132, any temporary registers which have had their values changed become active registers and their formerly active counterparts become temporary registers.

To prevent erroneous values from being stored into the memory when the results of the auxiliary pipeline are discarded, all memory store operations from the auxiliary pipeline are buffered through a store stack 128. These buffered store operations are completed only when the store stack receives an indication that the auxiliary pipeline has satisfactorily executed the group of instructions which gave rise to the operations. Although it is not required, memory store operations originating in the main pipeline 124 are also buffered through the store stack.

Any correction of data in the BHT 110 resulting from BHT errors encountered during the execution of a group of instructions occurs as set forth in the above-referenced Pomerene patent. This correction is indicated by the signal MBUD in FIG. 1. If an error in the BHT data is encountered during instruction execution by the auxiliary pipeline, the results produced by the auxiliary pipeline are discarded and the group of instructions is re-executed on the main pipeline.

The following is a more detailed description of the circuitry which constitutes the multiple sequence processor. This description is made with reference to FIGS. 2A through 5.

Figure 2B:
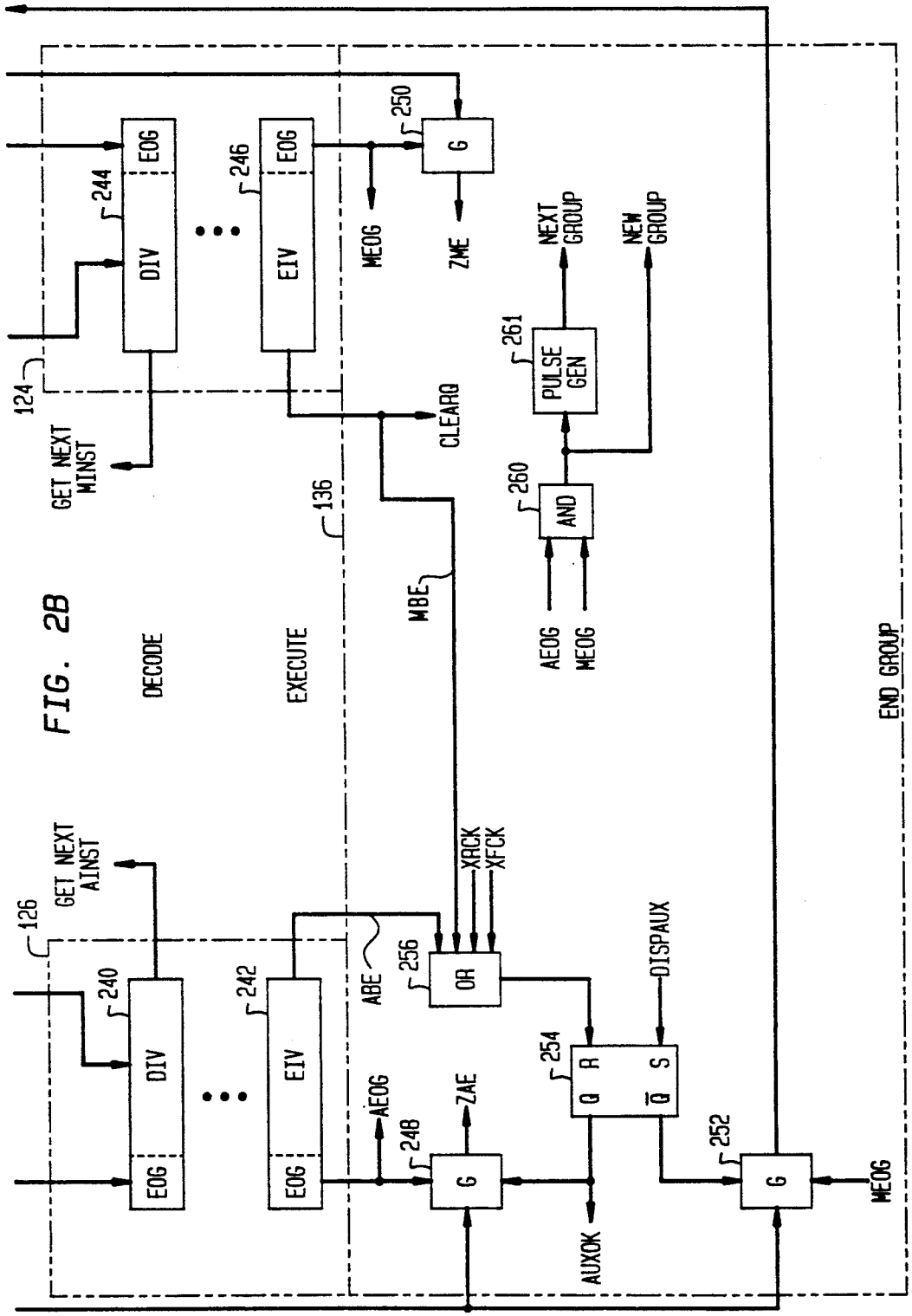
FIGS. 2A and 2B are two parts of a block diagram showing details of a portion of the multiple sequence pipeline processor shown in FIG. 1.

FIGS. 2A and 2B are two parts of a block diagram which are joined as indicated in an inset of FIG. 2A. The block diagram formed by these two FIGURES illustrates details of the group queue 118, group dispatcher 120, the end group circuitry 136 and the group selection circuitry 122. To simplify the explanation of the invention, the pipeline processors 124 and 126 are not shown in detail; only the connections to the group dispatcher 120 and end group circuitry 136 are illustrated.

As set forth above, the group queue 118 holds (TA, BA) instruction address pairs which indicate successive groups of instructions. The address values BA and TA are provided by the BHT as, for example, ($BA_0$, $TA_0$), ($BA_1$, $TA_1$), ($BA_2$, $TA_2$), etc. These address pairs are regrouped into pairs, ($TA_0$, $BA_1$), ($TA_1$, $BA_2$), etc. which define successive groups of instructions. These pairs of address values are stored in the group queue 118.

The group queue shown in FIG. 2A includes four registers 212 and control circuitry 210 which uses the registers 212 as an associative memory. The registers 212 include respective bit-fields ($TA_0$ through $TA_3$) for holding target address values that define the starting instructions of the respective groups and bit-fields ($BA_1$ through $BA_4$) for holding the respective branch address value which define the ending instructions of the groups. In addition, each of the registers 212 includes a group number (GN) bit field which is used by the control circuitry 210 to access the register and a full/empty field (F/E) which indicates whether the data in the register is valid. Invalid or empty entries are refilled automatically by the branch history table 110.

The control circuitry 210 is responsive to signals ZAE and ZME to mark the current main and auxiliary group entries as empty when the groups of instructions have been satisfactorily completed. The control circuitry 210 is also responsive to a group number value provided by the group selection circuitry 122 to provide TA, BA and GN values from the addressed register to the group dispatcher 120.

The group dispatcher 120 reads the group entries from the group queue 118 and selectively applies the TA, BA and GN fields of a given entry to a main instruction counter register 230 or to an auxiliary instruction counter register 220. The registers 230 and 220 are coupled to circuitry which controls the fetching of instructions from the instruction buffer 111 and which indicates to the respective main and auxiliary pipeline processors, which Instructions are the last instructions of the respective main and auxiliary groups.

The group dispatcher 120 operates as follows. Responsive to a value of, for example, zero provided by the group selection circuitry 122, the group queue 118 provides a TA value, $TA_0$, a BA value, $BA_1$, and a GN value, 0 to the gate circuits 216 and 214. The circuit 214 is conditioned by the $\overline{Q}$ output signal of a flip-flop 218 to pass the values $_0TA$, $_1BA$ and the GN value of zero to the main instruction register 230. The Q output signal of the flip-flop 218 inhibits the gate circuit 216 from applying these values to the auxiliary instruction register 220. On the next successive clock pulse, the group selection circuitry 122 applies a value of 1 to the group queue 118 and the internal state of the flip-flop 218 is toggled, to enable the gate 216 and disable the gate 214, This conditions the gate 216 to apply the values $TA_1$ and $BA_2$ to the auxiliary instruction register 220. The output signal of the flip-flop 218 that enables or disables the gate 216 Is a signal DISPAUX which Is applied to the end group circuitry 136.

When the system is first activated, the flip-flop 218 is controlled by the signals START and START+1. START forces the the flip-flop into a state which enables gate 214 and disables gate 216 and START+1 changes the state of the flip-flop 218, enabling gate 216 and disabling gate 214. In steady state operation, the flip-flop 218, which may be, for example, a conventional toggle-type flip-flop changes state in response to a double pulse signal, NEXT GROUP, to successively enable gates 214 and 216. The signal NEXT GROUP is generated by the end group circuitry 136 described below.

The remainder of the group dispatcher 120 consists of two identical circuits, one controlling the main pipeline processor 124 and one controlling the auxiliary pipeline processor 126. For the sake of brevity, only the circuit controlling the main processor is described herein. This circuit includes the instruction counter register 230, a comparator 232, a gate 234 and an incrementing circuit 236. In the example presented above, the instruction address values $TA_0$ and $BA_1$ and the group number value zero are stored into distinct fields; MTA, MBA and MGN; within the register 230. When the main pipeline processor 124 requests an instruction via the signal GET NEXT MINST, the contents of the field MTA are passed through a gate 234 to the instruction buffer 116, to the incrementing circuit 236, and to one Input port of a comparator 232. The instruction buffer 116 applies the instruction at this address to the main pipeline processor 124, the incrementing circuit 236 increments to the next Instruction address value, storing the result back into the MTA field of the register 230, and the comparator 232 compares the address value to the address value held In the register field MBA to determine if the addressed instruction is the last instruction of the group. The group number value, MGN, is passed on to the end group circuitry 136 where it is used as set forth below.

The instruction values provided by the instruction buffer 116 and end of group signals, provided by the comparators 232 and 222, indicating that the provided instruction is the last of its group, are applied to the respective main and auxiliary pipeline processors 124 and 126. As set forth above, each of these processors includes several stages. Each stage includes a register which holds the instruction value. Only the registers for the decode and execute stages are illustrated in FIG. 2B.

Referring to the main pipeline processor 124, the instruction value and the end of group signal are applied to respective fields DIV and EOG of a decode instruction register 244. Circuitry in the processor 124 associated with this register emits the signal GET NEXT MINST which conditions the group dispatching circuitry 120 to fetch the next instruction for the main pipeline processor. The EOG field is passed along with the instruction value as it is transferred among the various stages of the pipeline. When the instruction reaches the register 246 in the execute stage, the value in the EOG field is provided as a signal MEOG, indicating that the last instruction in the group of instructions being executed on the main processor has been completed.

Circuitry associated with the execute stage determines if a branch error has occurred. Branch errors may be of two types, either a branch instruction that was predicted by the BHT 110 as being taken is not taken, or a branch instruction that was not predicted by the BHT as being taken is taken. If either of these errors is detected by the main processor, the bit field EOG of the register 246 is set to one and a one valued signal MBE is emitted by the execute circuitry. Similarly, if either of these errors is detected by the auxiliary processor, a one valued signal ABE is emitted by its execute circuitry. The signal MBE is also used to clear the group queue 18 since an error in the branch history table necessarily invalidates the (TA, BA) pairs provided after the pair which included the error.

The signals MEOG, AEOG, MBE and ABE are applied to the end group circuitry 136. In addition, signals XRCH AND XFCH generated by the register check circuitry 134 and fetch check circuitry 132 and the signal DISPAUX generated by the group dispatcher 120 are applied to the end group circuitry 136. The register check circuitry 134 and fetch check circuitry 132 are described in detail below in reference to FIGS. 4 and 5, respectively.

As set forth above, the signal DISPAUX is generated by the group dispatcher 120 to send a (TA, BA) address pair from the group queue 118 to the section of the group dispatcher 120 which controls the auxiliary pipeline processor 126. This signal is applied to the set input terminal (S) of a conventional flip-flop 254. The reset input terminal (R) of the flip flop 254 is coupled to receive the logical OR of the signals ABE, MBE, XRCH and XFCH provided by an OR gate 256. The Q output terminal of the flip-flop 254 is a signal AUXOK.

The signal AUXOK is preset to have a value of one when a new group is dispatched to the auxiliary pipeline 126. It is reset to zero if any errors are detected which would invalidate the results produced by the auxiliary pipeline. If, at the end of a group of instructions executed by the auxiliary pipeline 126, the signals AUXOK, MEOG and AEOG all have a value of one, indicating that the group of instructions has been executed without incident, the value held in the group number field AGN of the register 220 is passed by the gate 248 to the control circuitry 210 as the signal ZAE, conditioning the group queue circuitry 118 to zero the entry corresponding to the group of instructions just completed by the auxiliary pipeline 126.

In the same manner, when the bit field EOG of the register 246 in the main pipeline is set, a gate 250 is enabled to pass the value held in the field MGN of the register 230 to the group queue circuitry 118. This value is used to zero the entry in the group queue corresponding to the group of instructions just completed by the main pipeline 124.

The signals AEOG and MEOG are combined by an AND gate 260 to generate a signal which is applied to a pulse generator 261. The pulse generator 261 produces the double pulse signal NEXT GROUP that is applied to the group dispatcher 120 as set forth above. This pulse signal is also applied to the group selection circuitry 122 to condition that circuitry to apply the next two valid entries from the group queue to the main and auxiliary pipelines, respectively.

The signal MEOG and an inverted version of the signal AUXOK, provided by the flip-flop 254, are applied to a gate 252 to enable the gate to apply the group number value AGN to the group selection circuitry 122. This signal path allows a group of instructions which were unsuccessfully executed on the auxiliary pipeline to be assigned as the next group of instructions to be executed by the main pipeline.

The signal provided by the gate 252 is logically ORed, by an OR gate 262, with a signal provided by a gate 268 indicating the next group of instructions to be executed. The output signal of the gate 262 is applied to an input port of a two-bit register 264. The reset input port of the register 264 is coupled to receive the signal START and a preset input port is coupled to receive the signal START+L. The output port of the register 264 is coupled to an incrementing circuit 266. The output port of the incrementing circuit is coupled to an input port of the gate 268. The gate 268 passes the output signal of the incrementing circuit 266 responsive to the logical AND of the double pulse signal NEXT GROUP and the signal AUXOK, provided by an AND gate 270.

Ignoring, for the moment, the effect of the signal provided by the gate 252, the group selection circuitry operates as follows. When the processor is first started, the signal START resets the group value provided by the register 264 to zero. Responsive to this value, the instruction group associated with the group number zero is applied to the main pipeline by the group queue 118 and group dispatcher 120. On the next successive clock pulse, a value of one is loaded into the register 264 responsive to the signal START+1. This value conditions the group queue and group dispatcher to apply the instructions associated with the group number 1 to the auxiliary pipeline. During normal operation, the value held in the register 264 is incremented by the incrementing circuitry 266 and, when the first pulse of the signal NEXT GROUP occurs, this value is loaded into the register 264. The second pulse of the signal NEXT GROUP loads the next successive value into the register 264.

If, however, the group of instructions executed by the auxiliary pipeline must be discarded, the group number of this group is applied to the preset input terminal of the register 264 via the OR gate 262. The register 264 loads this value in lieu of the value provided by the gate 268 on the first pulse of the signal NEXT GROUP. Consequently, the instructions in this group are the next instructions applied to the main pipeline 124. The second pulse of the signal NEXT GROUP conditions the register 264 to load the incremented value provided by the gate 268, this is the next successive group after the aborted group. The instructions in this group are the next instructions to be applied to the auxiliary pipeline 126.

An alternative embodiment of the invention is now described with reference to FIGS. 2C through 2F. In this alternative embodiment of the invention, the group delimiters are certain ones of the instructions which modify the registers in the register file 130, rather than taken branch instructions. In the instruction set of the IBM 3033 computer, these certain register modifying instructions are: L (Load); LH (Load-Half); BAL (Branch and Link); BALR (Branch and Link Register) the R2 field is set to zero, indicating no branch; SLR (Subtract Logical Register) when the L1 and L2 fields are equal, indicating that the register is to be reset; and the Serializing instruction. As a convenient shorthand, these instructions are referred to as L-instructions and the groups which they delimit are referred to as L-groups.

FIG. 2C is a segment of a program which is used to illustrate the difference between taken branch groups and L-groups. The segment shown in FIG. 2C is taken from a large program loop having taken branches numbered from 1 to 71. Taken branches 1–6 and 71 are included in this program segment and are indicated by circled numbers on the left of the FIG. 2C. The corresponding branch groups are indicated by brackets on the left of FIG. 2C. Similarly, the L-instructions are enclosed in boxes and the corresponding L-groups are indicated by brackets on the right of the FIG. 2C.

Even though taken branch instructions are not used as group delimiters, in this alternative embodiment of the invention, it is desirable to integrate an indication of the occurrence of the L-instructions into the branch history table since it is still a good predictor of future behavior of the system. FIG. 2D is a chart illustrating an exemplary structure for entries in the branch history table 110, which include data on L-instructions occurring between successive taken branch instructions. During an initial pass through the program segment shown in FIG. 2C, the processor generates BA (branch address) and TA (target address) fields for the branch history table shown in FIG. 2D as set forth above. In addition, a set of instruction count fields are generated to facilitate the implementation of this second embodiment of the invention.

These additional entries are used to define the L-groups occurring between successive taken branch instructions. The instructions between two taken branch instructions may contain the start of an L-group, continue a previously started L-group, end a previously started L-group, or they may completely contain one or more new L-groups.

In FIG. 2D, the additional entries labeled START, CONT and END contain a count of instructions in a branch group, starting with the taken branch instruction, which respectively start, continue or end an L-group. If, a branch group includes instructions which start a new L-group after instructions which end a previously started L-group, an entry is made in the field NEW1 for the number of instructions in the branch group which are also in the new group. If this new group is totally contained in the branch group and, the branch group includes further instructions which start yet another L-group, an entry containing the count of these further instructions is made in the field NEW2. Similarly, the fields NEW3 and NEW4 are provided for possible third and fourth new L-groups that may be started, or fully contained, in the set of instructions defining a branch group.

The fields START, CONT, END, NEW1, NEW2, NEW3 and NEW4 are filled during a first pass through the program and are updated whenever the branch information in the BHT 110 is updated. The following example illustrates how part of the table shown in FIG. 2D is generated from the program segment shown in FIG. 2C.

Referring to FIG. 2C, it is noted that branch 71 is followed by five instructions of the first L-group and that branch 71 is, itself, part of the first L-group. Thus, a five is placed in the END field of the branch history table entry for the branch 71 to indicate that the five instructions following the branch are an L-group and that the fifth instruction is the end of the L-group. The four instructions following the branch 1 start a second L-group, so, a four is placed in the START field for the branch 1. This second L-group is continued through the two instructions following branch 2, consequently, a two is placed in the CONT field of the BHT entry for branch 2. The first two instructions following the branch 3 end the second L-group, the next three instructions define a third L-group and the next five instructions define a fourth L-group. Accordingly, the branch history table entry for the branch 3 has a two in its END field, a three in its NEW1 field and a five in its NEW2 field. Proceeding in this manner, the BHT entries for the branches 4, 5 and 6 are filled in as shown in FIG. 2D.

Once the branch history table has been filled in, it may be used to direct the performance of the multiple sequence processing system. The first step is to fill the instruction buffer 116 based on the predicted taken branches from the BHT 110. Since data are fetched for storage in the instruction buffer 116 on a quad-word basis (i.e. 16 bytes per fetch), the instruction buffer may be assumed to be substantially full unless a BHT error has been detected. The operation of the BHT for prefetching instructions into the instruction buffer is described in the above referenced U.S. Pat. No. 4,679,141 to Pomerene et al. The example set forth below describes how the additional data in the BHT 110 is used to fill the group queue 118 so that the multiple sequence processing system may operate using L-groups.

The L-group entries in the group queue 118 are developed by a group data processor 111 shown in phantom in FIG. 1. Starting, for example with the BHT entry for branch 1, the processor 111 accesses the four in the START field of the branch 1 entry and starts a new group. Responsive to the entry for branch 2, the processor 111 adds the value two in the CONT field to its current group count value of four to generate a count value of six. From the BHT entry for branch 3, the processor 111 takes the value of two in the end field, adds it to the count value of six to obtain a count value of eight and then marks the group count entry (L-group 2) as complete. Next, the processor 111 takes the value three in the NEW filed of branch 3 and sets up a group count of three for the L-group 3. Using the same procedure, the processor 111 then sets up a group count of five for the L-group 4. Using the algorithm outlined above, the processor 111 then generates group counts of four, four, and three for the L-groups 5, 6 and 7, respectively. These group counts correspond to the numbers of instructions in the L-groups 2–7 as shown in FIG. 2C.

Once the group counts for the L-groups have been determined, it is helpful to do two more things: combine small groups to generate groups that are of sufficient size to be efficient, and associate the L-groups with the addresses of instructions with which they begin. In the present example, a rule is established that no L-group shall contain fewer than eight instructions. Consequently, L-groups 1 and 2 are combined to generate an L-group 1-2 having 14 instructions, L-groups 3 and 4 are combined to generate an L-group 3-4 having eight instructions and L-groups 5 and 6 are combined to generate an L-group 5-6 having eight instructions.

Each of the L-groups 1-2, 3-4 and 5-6 is then associated with the BA (branch address) - TA (target address) pairs of each BHT entry which defines the L-group and the group data is stored into the group queue 118 as shown in FIG. 2E. These BA, TA pairs are in the same order as in the BHT 110; they are not rearranged as set forth above in reference to FIG. 2A. Using the data shown in FIG. 2E, the group dispatcher 120 provides a start address of 02DE28 and a group count of 14 to the main pipeline 124, a start address of 02E210 and a group count of eight to the auxiliary pipeline 126, a start address of 02E234 and a group count of eight to the main pipeline 124, and so on. The extra BA, TA pairs for each L-group are provided to the group dispatcher 120 as each taken branch is encountered.

Figure 2H:
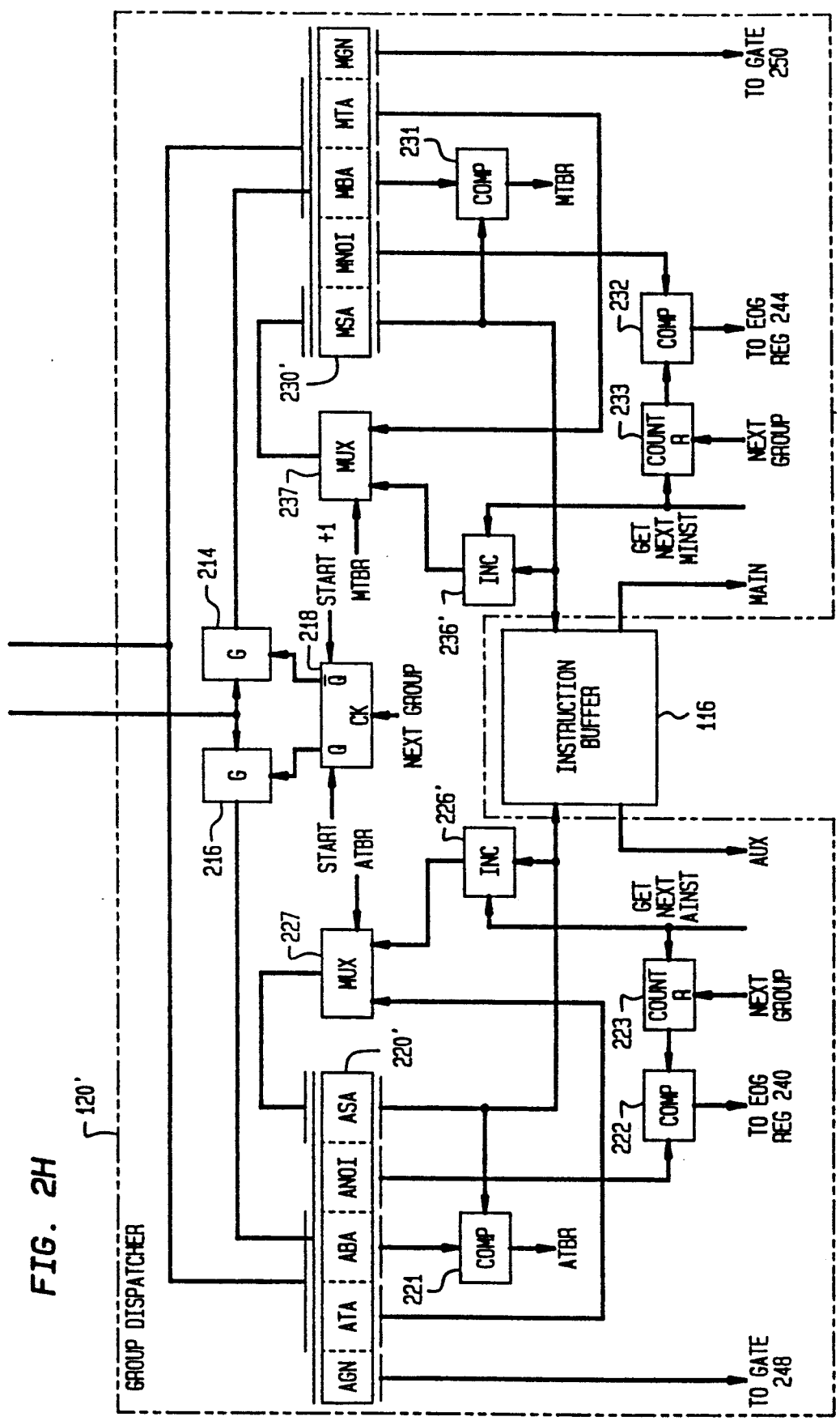
FIG. 2C is a sequence of machine language in structions that is useful for explaining an alternative embodiment of the multiple sequence processor shown in FIG. 1.
FIG. 2D is a chart illustrating the contents of a branch history table for use with the alternative embodiment of the invention.
FIG. 2E is a chart illustrating the contents of an alternative group queue for use with the alternative embodiment of the invention.
FIG. 2F is a diagram which illustrates the relationship between FIGS. 2G, 2H and 2B FIGS. 2G and 2H are block diagrams showing details of the alternative embodiment of a portion of the multiple sequence processor shown in FIG. 1.

The combination of FIGS. 2G and 2H is a block diagram showing how the group queue 118 and group dispatcher 120 may be modified to accommodate the additional information used to implement L-groups. FIG. 2F is drawn in the same manner as FIG. 2A and may be substituted therefor, as indicated in the inset of FIG. 2F, to produce a block diagram of this alternative embodiment of the invention.

In FIG. 2G, a group queue 212' is shown having the same contents as the queue shown in FIG. 2E. The group numbers have been changed such that groups 1-2, 3-4 and 5-6 are now groups 0, 1 and 2, respectively. As in the first embodiment of the invention, described above, group entries, from the group queue 212' are applied to the group dispatcher 120' via the gates 214 and 216 in response to group numbers provided by the group selection circuitry 122. The group dispatcher 120' includes two identical circuits, which control instruction sequencing on the main pipeline 124 and on the auxiliary pipeline 126, respectively. For the sake of brevity, only the circuitry for the main pipeline 124 is described below.

The group dispatcher 120' first applies the start address value (SA), held in the field MSA of the register 230', to the instruction buffer 116. This conditions the buffer 116 to apply the instruction at that address to the main pipeline 124. When the group entry does not have any branch address (BA) or target address (TA) entries, the value in the field MSA is incremented, via incrementing circuitry 236', and stored back into the field MSA via a multiplexer 237. Each time the instruction address value is incremented (i.e. at each pulse of the signal GET NEXT MINST), the value in a counter 233 is incremented. This counter is reset by the signal NEXT GROUP, so its value indicates the number of instructions in a group which have been executed so far. This value is compared, by a comparator 232, against the number of instructions (NOI) value for the group, held in the field MNOI. When these values are equal, the comparator 232 provides the end of group (EOG) signal to the main pipeline 124.

If a group entry has non-zero BA and TA fields, a comparator 231 compares the address value of the next instruction in the field MSA to the branch address value held in the field MBA. When the two values are equal, the comparator 231 generates a signal MTBR which conditions the multiplexer 237 to store the target address value TA, held in the field MTA, into the field MSA in place of the incremented address value. This step anticipates the outcome of the branch instruction at the address BA. In addition, the signal MTBR is applied to the control circuitry 210' of the group queue 118' to condition that circuitry to apply the next BA, TA pair for the current group to the fields MBA and MTA of the register 230'. This operation sets the register up for the next taken branch, allowing the group dispatcher 120' to anticipate the next taken branch instruction.

The group dispatcher 120' continues to process instruction addresses as outlined above until the EOG signal provided by the comparator 232 has propagated through the main pipeline 124 to the end group circuitry 136. In the same manner, the auxiliary group dispatching circuitry in the group dispatcher 120' processes a group entry to apply instructions to the auxiliary pipeline 126. In this alternative embodiment of the invention, the pipeline processors 124 and 126, the end group circuitry 136 and the group selection circuitry 122 operate in the same manner as described above in reference to FIGS. 2A and 2B.

As set forth above in reference to FIG. 1, the main and auxiliary pipelines 124 and 126 share a register file 130. The register file 130 contains 16 pairs of general purpose registers (GPR's). One member of each pair is "active" at a given time and one member is "temporary". As previously explained, the main pipeline 124 works with only the active registers while the auxiliary pipeline 126 may work with both the active and temporary registers.

Figure 3A:
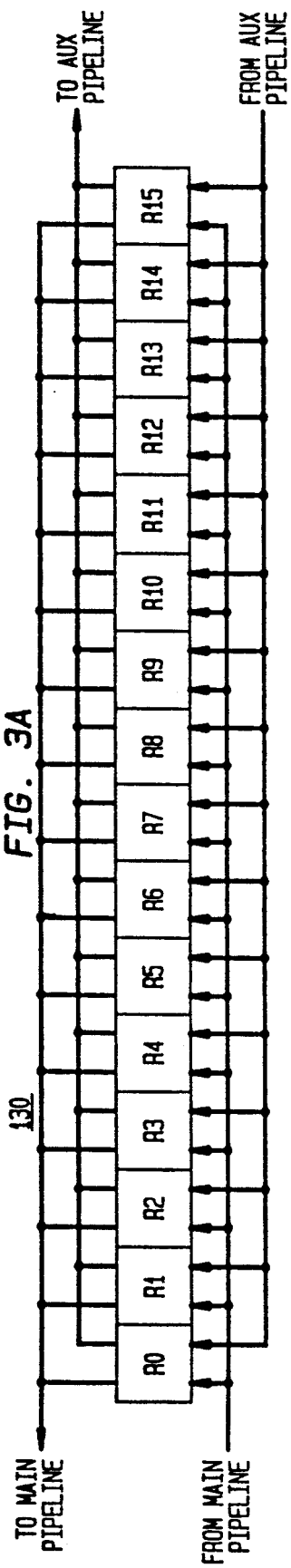
FIGS. 3A and 3B are block diagrams showing details of a register file suitable for use in the multiple sequence processor shown in FIG. 1.
Figure 3B:
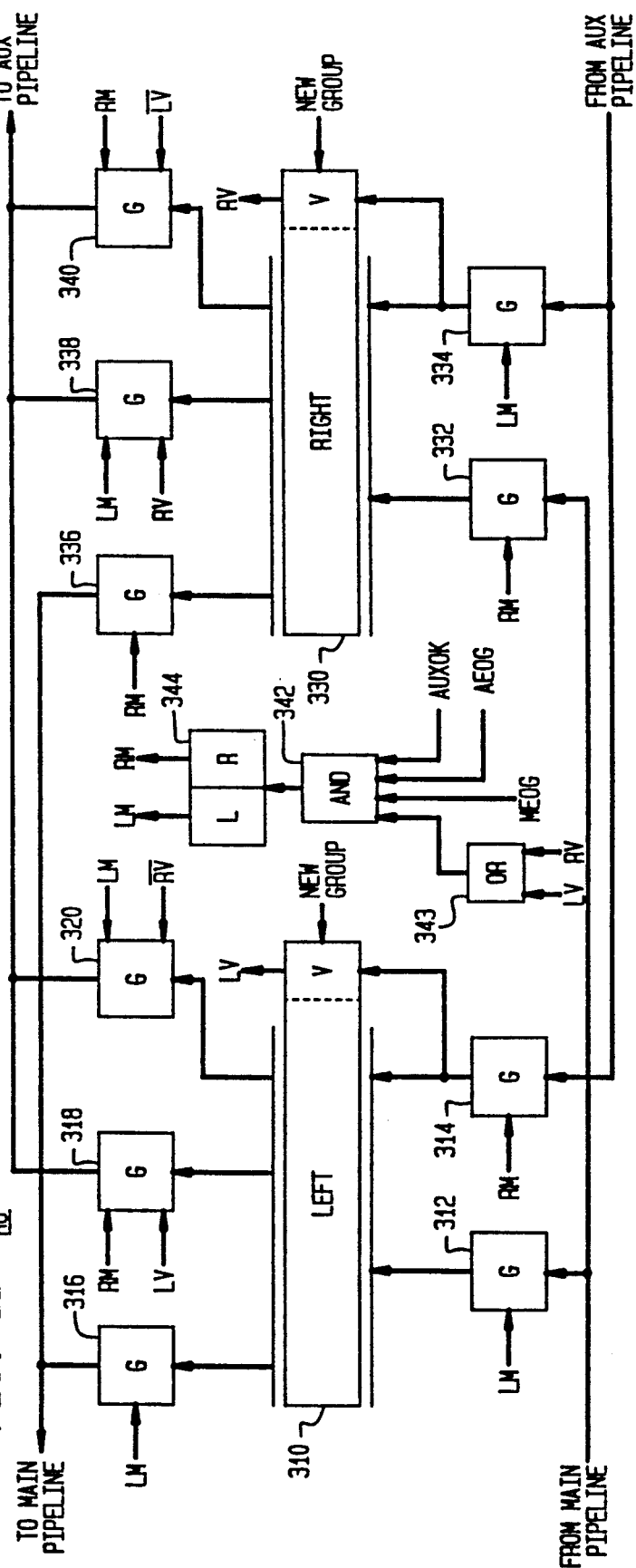

FIG. 3A shows the register file 130 and FIG. 3B shows an exemplary register pair, R8, from the register file 130 in greater detail. The register pair R8 includes a 32-bit register, 310 labeled LEFT and a 32-bit register 330 labeled RIGHT. Each of the registers 310 and 330 has a valid bit, V, in addition to the 32 data bits. A flip-flop 344 determines, by its state, whether the register 310 or the register 330 is active. The other register of the pair is then temporary. The flip-flop 344 is toggled by a signal provided by an AND gate 342.

The gates below the registers 310 and 330 in FIG. 3B determine which register is loaded by which pipeline. The main pipeline 124 loads the active register via the gate 312 or 332, if the active register is register 310 or 330, respectively. The auxiliary pipeline 126 loads the other register as the temporary register via the gate 314 or 334. When a value is loaded into a temporary register, the valid bit of the register is set to one.

The gates above the registers 310 and 330 in FIG. 3B determine which register is read by which pipeline. The main pipeline 124 reads the active register via gate 316 if the register 310 is active or via gate 336 if the register 330 Is active. As set forth above, the auxiliary pipeline 126 reads values from the active register only if it has not previously written into the corresponding temporary register. The valid bit of a temporary register is reset unless the register has been written into. Thus, data for the auxiliary pipeline is read out of the register pair via gate 318 or 338 if the respective register 310 or 330 is temporary and has been written into during the currently active instruction group. Otherwise, data is read out via the gate 320 or 340 if the respective register 310 or 330 is active.

When both the main and auxiliary pipelines signal end of group (MEOG=1 and AEOG=1) and there are no problems with the auxiliary group (AUXOK=1) then each temporary register that has its valid bit set is switched to be an active register and all valid bits are reset. This switching is accomplished by an OR gate 343, the AND gate 342 and the flip-flop 344. When the main pipeline signals end of group and the auxiliary results are to be discarded (MEOG=1 and AUXOK=0), the temporary registers remain temporary and all valid bits are reset.

As described above, one way in which the results of the auxiliary pipeline can be declared invalid is if the auxiliary pipeline reads a register that is subsequently written into by the main pipeline during its current instruction group. The register check circuitry 134 monitors the use of the GPR's by the auxiliary pipeline, whether as an operand (R), a base (B) or an index (X) and checks whether the values held by any of these registers are changed by the main processor after such usage. If the circuitry 134 detects any events of this type, it signals the end group circuitry 136 via the signal XRCH.

Figure 4:
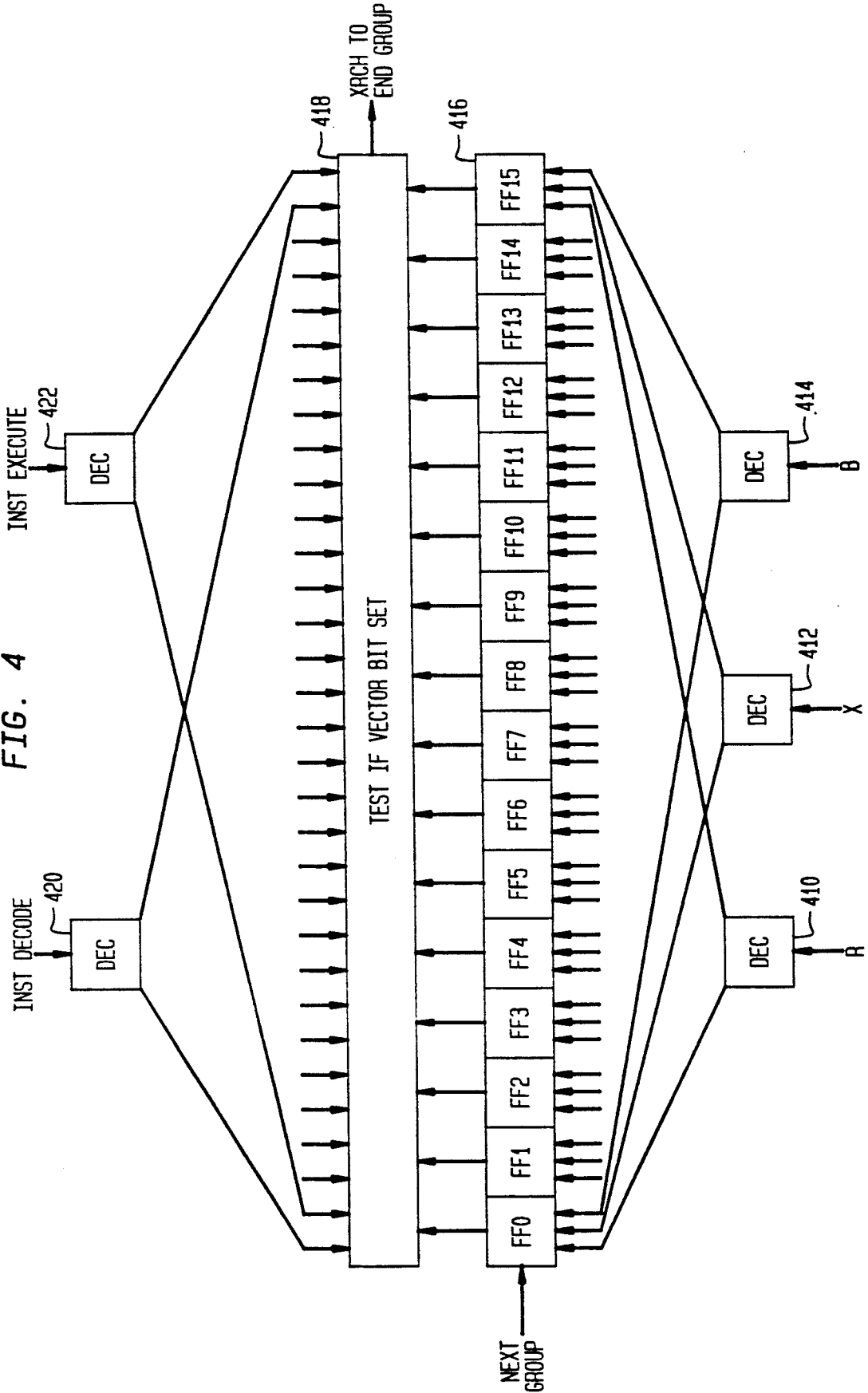
FIG. 4 is a block diagram of register check circuitry suitable for use in the embodiment of the invention shown in FIG. 1.

FIG. 4 is a block diagram of exemplary register check circuitry 134. As each instruction is decoded by the auxiliary pipeline 126, its R, X and B fields, if present, are supplied to the respective decoders 410, 412 and 414. Each decoder sets a bit in the 16-bit GPR usage vector when a location in the main memory 114 is read by the auxiliary processor via the cache 112 and the value held by that memory location is subsequently changed by the main pipeline during its current instruction group. This type of event is called an out-of-sequence fetch. To detect events of this type, the circuitry shown in FIG. 1 includes fetch check circuitry 132.

Figure 5:
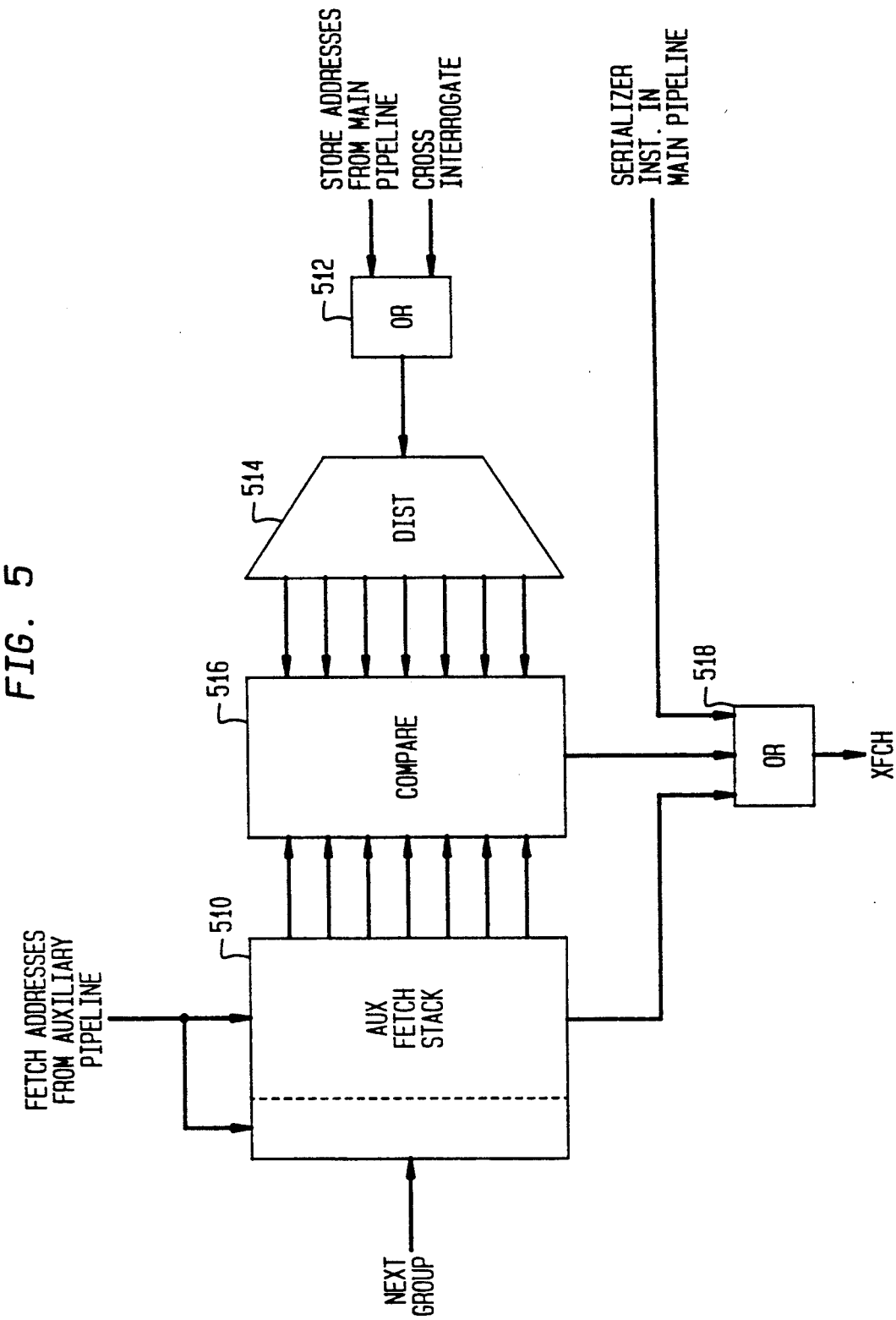
FIG. 5 is a block diagram of fetch check circuitry suitable for use In the embodiment of the invention shown in FIG. 1.

FIG. 5 is a block diagram showing the major functions of the fetch check circuitry 132. Memory read addresses generated by the auxiliary pipeline are saved in a stack 510 for the duration of the longer of the main and auxiliary instruction groups. All addresses in the stack are compared with the write addresses values from the main pipeline and with any cross-interrogate addresses generated by other processors, if the present processor is used in a multiprocessor environment. If any of these addresses match an address in the stack, then the auxiliary pipeline would have fetched an old value instead of a correct new value and the results of the auxiliary pipeline should be discarded. Circuitry suitable for use as the fetch check circuitry 132 is described in detail in a copending U.S. patent application Ser. No. 051,792 entitled "Posting Out-of-sequence Fetches", filed May 18, 1987 and assigned to the assignee of the present application.

Referring to FIG. 1, the store stack 128 is a standard component of a high performance processor. As used in this invention, it has two parts. The main part takes memory write operations from the main pipeline 124; these are handled as in a conventional store stack. The auxiliary part takes memory write operations from the auxiliary pipeline 126. These may not be completed unless and until it is determined that the auxiliary results are valid (AUXOK=1). If the results of the auxiliary pipeline are found to be valid, these memory write operations are performed after the memory write operations for the main pipeline.

While the present invention is described in a processing environment which uses two pipelined processors, It is contemplated that, by straightforward extension of the techniques taught herein, a system using the present invention may be implemented in a processing environment that uses more than two pipelined processors or that uses simpler, non-pipelined processors.

The invention described herein provides a performance advantage over processing systems which include only one pipelined processor since groups of sequential instructions may be executed concurrently and, so, the total time needed to complete the combined instructions may be reduced.

Those skilled in the art will recognize that while the invention has been described in terms of two exemplary embodiments, it may be practiced as outlined above with modifications within the spirit and scope of the appended claims.

The invention claimed is:

1. A digital data processing system, comprising:
   means for providing one sequence of machine instructions from a single task, which sequence of machine instruction is dividable into at least a first group of sequential machine instructions and a second group of sequential machine instructions according to a predetermined delimiting rule;
   queueing means for storing first and second values which identify, respectively, said first and second groups of sequential machine instructions in the sequence;
   main and auxiliary data processing means each of which is able to execute any instruction in the sequence;
   data storage means, coupled to the main and auxiliary processing means, for holding data values which may be modified by said main and auxiliary processing means as a result of executing instructions in the sequence of machine instructions;
   means for dispatching the first and second values to the respective main and auxiliary data processing means to cause said main processing means to obtain and execute the first group of sequential machine instructions and, concurrently, to cause the auxiliary processing means to obtain and execute the second group of sequential machine instructions;
   checking means, coupled to said main and auxiliary data processing means, for detecting the occurrence of an action taken by said main data processing means on one of the data values held by the data storage means which action affects one of the data values held by the data storage means that is used during the concurrent execution of said second group of sequential machine instructions by said auxiliary data processing means; and
   means for selectively invalidating the execution of said second group sequential machine instructions by said auxiliary data processing means responsive to the detection of said action.

2. The digital data processing system set forth in claim 1, wherein:
   the data storage means includes a register file including a plurality of general purpose registers for use by each of said main and auxiliary data processing means; and
   said checking means includes means, coupled to said register file, for resolving conflicting use of said plurality of general purpose registers by said main and auxiliary data processing means in executing the respective first and second groups of machine instructions.

3. The digital data processing system set forth in claim 2, wherein said checking means includes register check means for detecting conflicts in the use of any of said plurality of general purpose registers by said main and auxiliary processing means and, upon detecting one of said conflicts, for invoking said invalidating means to invalidate the execution of said second group of sequential machine instructions by said auxiliary processing means.

4. The digital data processing system set forth in claim 2, wherein said predetermined delimiting rule delimits successive groups of sequential machine instructions by occurrences of successive members of a predetermined set of machine instructions, where each machine instruction in said set modifies data in said register file, and said digital data processing system further includes means, coupled to said main and auxiliary data processing means, for providing said group delimiting values, representing respective delimiting addresses of the machine instructions in said first and second groups of sequential machine instructions, as said identifying values to said queueing means.

5. The digital data processing system set forth in claim 1, wherein said predetermined delimiting rule delimits successive groups of sequential machine instructions by occurrences of successive taken branch instructions, and said digital data processing system further includes means, coupled to said main and auxiliary data processing means, for providing said group delimiting values representing the addresses of said taken branch instructions to said queueing means as said identifying values.

6. The digital data processing system set forth in claim 1, wherein said means for providing one sequence of machine instructions dividable into at least a first group of sequential machine instructions and a second group of sequential machine instructions includes means for monitoring taken branch instructions executed by said main and auxiliary data processing means and for storing respective addresses of target instructions of each taken branch instruction, wherein the means for monitoring taken branch instructions is coupled to said queuing means to provide the stored addresses of the target instructions as said identifying values.

7. In a digital computer system including first and second data processors, a method for processing a sequence of machine instructions form a single task, the sequence being dividable into first and second groups of sequential machine instructions in accordance with a delimiting rule, wherein each of the first and second data processors is able to execute any instruction in the sequence, said method comprising the steps of:

A. delimiting said first and second groups of sequential machine instructions in said sequence of instructions according to said delimiting rule to produce first and second identifying values which identify, respectively, the first and second groups of sequential machine instructions;

B. storing the first and second values which identify the respective first and second groups of sequential machine instructions in a single queue;

C. dispatching said first and second identifying values from said queue to said first and second data processing means, respectively, to cause said first data processing means to obtain and execute said first group of sequential machine instructions on said first data processing means and, concurrently, to cause the second processing means to obtain and execute said second group of sequential machine instructions on said second data processing means; and D. storing data values which are modified by said main and auxiliary processing means as a result of executing instructions in the sequence of machine instructions in a shared data store;

monitoring said first and second data processing means to detect the occurrence of an action taken by said first data processing means on one of the data values stored in the shared data store in executing said first group of sequential machine instructions, which action affects one of the data values held by the data storage means that is used during the concurrent execution of said second group of sequential machine instructions by said second data processing means; and selectively invalidating the execution of said second group sequential machine instructions by said second data processing means in response to the detected occurrence of said action.

8. In a digital computer system including first and second data processing means, a method for processing a sequence of machine instructions that is dividable into first and second groups of sequential machine instructions in accordance with a delimiting rule, comprising the steps of:

delimiting said first ad second groups of sequential machine instructions in said sequence of instructions according to said delimiting rule to produce first and second values which identify the respective first and second groups of sequential machine instructions in the sequence of instructions;

storing the first and second values which identify said first and second groups of sequential machine instructions in a single queue;

dispatching said first and second values form said queue to said first and second data processing means, respectively, to cause said first processing means to obtain and execute said first group of sequential machine instructions on said first data processing means to obtain and execute the second data processing means to obtain and execute said second group of sequential machine instructions on said second data processing means;

storing data values, which are modified by said main and auxiliary processing means as a result of executing instructions, in the sequence of machine instructions in a shared data store;

monitoring said first and second data processing means to detect an occurrence of an action taken by said first data processing means on one of the data values stored in the shared data store in executing said first group of sequential machine instructions, which action affects one of the data values held by the data storage means which is used during the concurrent execution of said second group of sequential machine instructions by said second data processing means;

invalidating the execution of said second group of sequential machine instructions by said second data processing means in response to the detected occurrence of said action;

dispatching said second value representing said second group of sequential machine instructions to said first data processing means in response to the invalidation of the execution of said second group of sequential machine instructions by the second data processing means.

9. The method set forth in claim 7 wherein step A includes the steps of:

detecting the occurrence of a taken branch instruction in said sequence of machine instructions; and dividing said sequence of machine instructions into said first group of sequential machine instructions which precede and include said taken branch instruction and said second group of sequential machine instructions which follow said taken branch instruction; and providing respective first and second address values pointing to the respective first instructions in the first and second groups of sequential machine instructions as the first and second identifying values, respectively.

10. The method set forth in claim 7 wherein step A includes the steps of:

detecting the occurrence of an instruction from a set of machine instructions which modify data which may be used by both of the first and second data processing means; and dividing said sequence of machine instructions into said first group of sequential machine instructions which precede said detected instruction and said second group of sequential machine instructions which include and follow said detected instruction; and providing respective first and second address values pointing to the respective first instructions in the first and second groups of sequential machine instructions as the first and second identifying values, respectively.

11. A digital data processing system, comprising:

means for providing a sequence of machine instructions form a single task;

means for dividing said sequence of machine instructions into first and second groups of sequential machine instructions according to a delimiting rule;

main and auxiliary data processing means each of which is able to execute any instruction in the sequence;

data storage means, coupled to the main and auxiliary processing means, for holding data values which may be modified by said main and auxiliary processing mean as a result of executing instructions in the sequence; and means for dispatching the first and second groups of instructions to the respective main and auxiliary data processing means to cause said main processing means to obtain and execute the first group of machine instructions and, concurrently, to cause the auxiliary processing means to obtain and execute the second group of machine instructions;

checking means, coupled to said main and auxiliary data processing means, for detecting the occurrence of an action taken by said main data processing means on one of the data values held by the data storage means which action affects one of the data values held by the data storage means that is used during the concurrent execution of said second group of sequential machine instructions by said auxiliary data processing means; and means for selectively invalidating the execution of said second groups of sequential machine instructions by said auxiliary data processing means responsive to the detection of said action.

* * * * *